(12) United States Patent
Scharf et al.

(10) Patent No.: US 9,587,698 B2
(45) Date of Patent: Mar. 7, 2017

(54) BASE ELEMENT

(71) Applicant: Boge Elastmetall GmbH, Damme (DE)

(72) Inventors: Jörg Scharf, Eppenrod (DE); Bernhard Neuss, Wachtberg (DE)

(73) Assignee: BOGE Elastmetall GmbH, Damme (DE)

( * ) Notice: Subject to any disclaimer, the term of this patent is extended or adjusted under 35 U.S.C. 154(b) by 160 days.

(21) Appl. No.: 14/418,770

(22) PCT Filed: Jul. 1, 2013

(86) PCT No.: PCT/EP2013/063799
§ 371 (c)(1),
(2) Date: Jan. 30, 2015

(87) PCT Pub. No.: WO2014/019785
PCT Pub. Date: Feb. 6, 2014

(65) Prior Publication Data
US 2015/0292588 A1    Oct. 15, 2015

(30) Foreign Application Priority Data

Jul. 31, 2012 (DE) ......................... 10 2012 213 442

(51) Int. Cl.
*F16F 7/00* (2006.01)
*F16F 9/54* (2006.01)
(Continued)

(52) U.S. Cl.
CPC .................. *F16F 1/36* (2013.01); *B05D 3/12* (2013.01); *F16F 1/373* (2013.01); *B05D 5/00* (2013.01);
(Continued)

(58) Field of Classification Search
None
See application file for complete search history.

(56) References Cited

U.S. PATENT DOCUMENTS 1,830,117 A * 11/1931 Lee ........................... F16F 1/50
267/141
4,200,307 A * 4/1980 Szabo .................. B60G 15/068
267/220
(Continued)

FOREIGN PATENT DOCUMENTS

DE 19925953 C1 * 9/2000 ........... B29C 65/562
DE 10142210 C1 5/2003
(Continued)

OTHER PUBLICATIONS

Machine Translation of EP 476497 A1, Mar. 1992.*
International Search Report for co-pending application Serial No. PCT/EP203/063799, dated Aug. 9, 2013.

*Primary Examiner* — Jeff Vonch
(74) *Attorney, Agent, or Firm* — Dinsmore & Shohl LLP; Douglas Wathen

(57) ABSTRACT

A base element for fastening a component to fastening holes which are made in a metallic base body is coated with an elastomer. The base element may be provided with an anti-corrosion coating, but can nevertheless be adapted individually for different installation situations and can be produced economically. Fastening holes may form at least two holes patterns and at least one of the hole patterns is rendered unusable by way of the formation of the elastomer on the base body.

9 Claims, 1 Drawing Sheet

(51) Int. Cl.
  *F16F 1/36* (2006.01)
  *B05D 3/12* (2006.01)
  *B05D 5/00* (2006.01)
  *F16F 1/373* (2006.01)
  *F16F 1/38* (2006.01)

(52) U.S. Cl.
  CPC ...... *B05D 2202/00* (2013.01); *B05D 2502/00* (2013.01); *B05D 2530/00* (2013.01); *F16F 1/3849* (2013.01); *F16F 7/00* (2013.01); *F16F 9/54* (2013.01); *F16F 2230/0005* (2013.01); *F16F 2230/0023* (2013.01); *F16F 2230/32* (2013.01); *Y10T 29/49707* (2015.01); *Y10T 428/24273* (2015.01); *Y10T 428/24339* (2015.01); *Y10T 428/24802* (2015.01); *Y10T 428/24917* (2015.01)

(56) References Cited

U.S. PATENT DOCUMENTS

| | | | | |
|---|---|---|---|---|
| 4,288,063 A * | 9/1981 | Brenner | F16F 13/24 | 248/635 |
| 4,382,587 A * | 5/1983 | Heinrich | F16F 1/36 | 188/378 |
| 4,387,023 A * | 6/1983 | Napier | B01D 35/0273 | 210/167.08 |
| 4,687,188 A * | 8/1987 | Knurek | F16F 13/14 | 264/261 |
| 4,815,629 A * | 3/1989 | Tausk | B65D 39/00 | 220/233 |
| 4,913,786 A * | 4/1990 | Horiki | B05D 1/32 | 205/118 |
| 5,172,985 A * | 12/1992 | Constancio | F16C 27/066 | 384/536 |
| 5,221,065 A * | 6/1993 | Siems | F16L 3/137 | 248/65 |
| 5,251,865 A * | 10/1993 | Kelly | B60K 17/00 | 180/292 |
| 5,277,410 A * | 1/1994 | Oshima | F16F 13/24 | 267/140.11 |
| 5,295,755 A * | 3/1994 | DeHaan, III | A47B 97/00 | 248/205.3 |
| 5,722,631 A * | 3/1998 | Dorton | F16B 5/0258 | 248/632 |
| 5,772,189 A * | 6/1998 | Satori | F16F 13/10 | 267/140.13 |
| 5,836,427 A * | 11/1998 | Nakajima | F16B 43/001 | 188/73.37 |
| 6,088,458 A * | 7/2000 | Hasegawa | F16F 15/04 | 381/71.4 |
| 6,503,435 B1 * | 1/2003 | Estrich | B29C 37/0082 | 264/261 |
| 7,350,777 B2 * | 4/2008 | Ogawa | F16F 1/54 | 267/140.4 |
| 7,458,565 B2 * | 12/2008 | Miyahara | F16F 1/3849 | 248/636 |
| 7,503,415 B2 * | 3/2009 | Hasegawa | B62K 11/04 | 180/219 |
| 7,959,805 B2 * | 6/2011 | Chisholm | B01D 63/082 | 204/627 |
| 8,430,373 B2 * | 4/2013 | Nishi | F16F 13/108 | 248/562 |
| 2003/0146043 A1 * | 8/2003 | Dehesdin | F16F 9/306 | 181/204 |
| 2003/0205856 A1 * | 11/2003 | Hibi | F16F 13/105 | 267/140.13 |
| 2006/0073226 A1 * | 4/2006 | Kimura | B29C 45/14336 | 425/129.1 |
| 2007/0216103 A1 * | 9/2007 | Flemming | F16J 15/062 | 277/313 |
| 2007/0262486 A1 * | 11/2007 | Waters | B29C 45/14467 | 264/220 |
| 2008/0160253 A1 * | 7/2008 | Liu | B29C 45/14344 | 428/138 |
| 2008/0268191 A1 * | 10/2008 | Liao | B32B 3/266 | 428/35.7 |
| 2009/0098345 A1 * | 4/2009 | Brasher | B32B 3/266 | 428/173 |
| 2010/0144171 A1 * | 6/2010 | Lechner | H01R 12/724 | 439/78 |
| 2010/0167008 A1 * | 7/2010 | Maisch | E04B 2/7457 | 428/139 |
| 2012/0001373 A1 | 1/2012 | McLaughlin | | |

FOREIGN PATENT DOCUMENTS

| | | | | |
|---|---|---|---|---|
| DE | 102004039436 A1 * | 2/2006 | | A47L 15/4225 |
| DE | 102008021207 A1 | 10/2008 | | |
| EP | 476497 A1 * | 3/1992 | | |
| EP | 1595676 A1 | 11/2005 | | |
| JP | 2005121150 A * | 5/2005 | | |
| JP | 2006226528 A * | 8/2006 | | |
| JP | 2012007724 A * | 1/2012 | | |
| WO | WO 2011147304 A1 * | 12/2011 | | F16B 2/06 |
| WO | WO 2012062448 A1 * | 5/2012 | | |

* cited by examiner

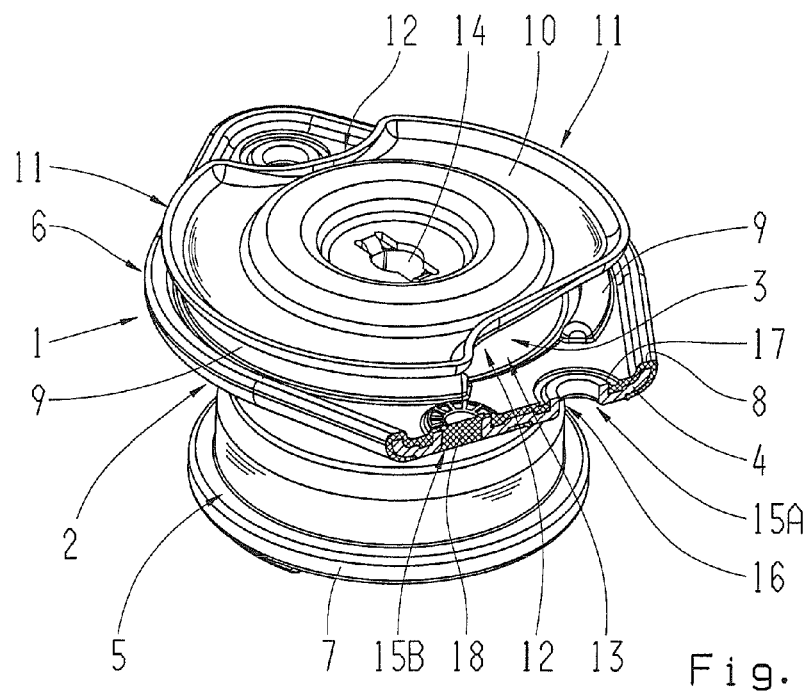
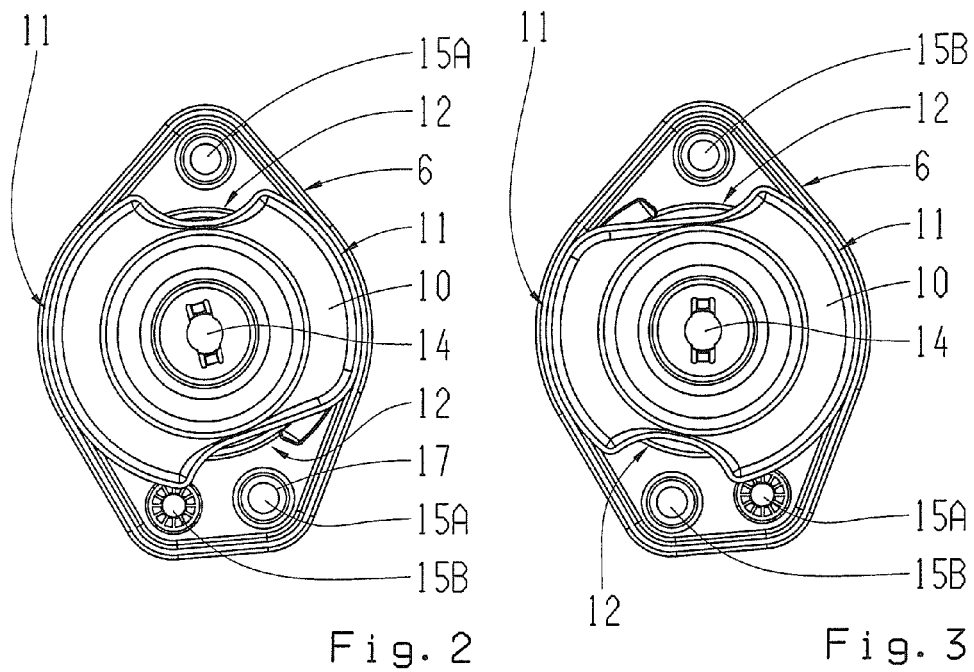
Fig. 1
Fig. 2   Fig. 3

BASE ELEMENT

FIELD OF THE INVENTION

This invention relates to a base element for fastening a component by means of mounting holes which are made in a metallic base body which is coated with an elastomer layer. Such base elements are usually formed as a sheet metal part and serve to fasten a component. The component can in particular be a damping element which defines two connection areas which are joined together by means of the elastomer. Such damping elements are generally known as elastomer damping elements or hydro bearings. Since with such damping elements the elastomer is used to transfer forces between the connection areas in a damping manner, elastomer is usually also pulled over the metallic parts, including the base element, so that by this means protection against corrosion is effected. A separate lacquer coating acting as a corrosion protection layer is consequently superfluous (cf. also DE 101 42 210 C1 or DE 10 2008 021 207 A1).

BACKGROUND OF THE INVENTION

In conventional base elements, the mounting holes are provided in a hole design which is contingent on the installation situation. The mounting holes are correspondingly positioned relative to one another in such a way that they are arranged at the desired mounting position in the installation situation of the base element. During construction, identical components are sometimes fitted at different installation positions and also in different installation situations. In this case, it can be necessary to provide mounting holes in a different arrangement, in order to fasten the base element together with the component. Although there is the possibility of providing a plurality of mounting holes for possible variants, of which only one selection of mounting holes is used in a specific installation situation, a plurality of mounting holes provided on the base element increases the risk of faulty assembly. The assembly is also over-complicated and prolonged due to the necessity of selecting the correct mounting hole in each case.

SUMMARY OF THE INVENTION

This invention is based on the object of producing a base element of the type mentioned in the introduction which is cost-effectively protected against corrosion and enables more than one fastening variant to be used while avoiding the problems described above.

With this invention, a base element having the features of claim 1 is proposed to achieve this object. This base element is characterised by the fact that the mounting holes form at least two hole designs and that at least one of the hole designs is unusable due to the formation of the elastomer on the base body.

The base element according to the invention has at least two different hole designs, i.e. it can be assembled in two different installation situations. The installation situation occurs by means of fastening eyes or bolts formed corresponding to the mounting holes. The base element has at least two hole designs, wherein each individual hole design is formed adapted for a specific installation situation. This includes the possibility of two different hole designs sharing one or more mounting holes. In this way, two different hole designs can already be formed by three mounting holes in total on the base element. The base element is in particular a sheet metal part which is formed by stamping or bending and forms a mounting flange which supports a component formed onto it in one or more parts, for example an inner part or an outer part of an elastomeric bearing. The inner part and the outer part mesh uniformly and are joined together by an intermediate layer of the elastomer which forms a damping elastomer body there.

In the case of the base element according to the invention, the elastomer in addition acts as a protection against corrosion, i.e. it usually almost completely coats the metallic base body. Usually, however, at least one contact surface is left free for the base element, i.e. it is not coated with the elastomer material, in order to obtain an exact contact surface for fastening the base element. At the same time, a very thin coating is already sufficient. It is above all essential that the metallic surface of the base body is completely sealed by the elastomer material. Furthermore, the elastomer material is also formed in such a way that the mounting hole or mounting holes of at least one of the hole designs is or are unusable due to the formation of the elastomer. Unusable in this sense means that the assembly fitter can already recognise with a visual inspection that the mounting holes of a hole design made unusable by the elastomer are not suitable for fastening. This does not mean that these holes cannot necessarily be used for fastening. Therefore, it already suffices to provide through the elastomer material an indicator usually protruding down inwardly from the inner circumferential coating of the metallic base body and indicating that that particular mounting hole is not to be selected for assembling the corresponding variant.

Thus, according to a preferred further embodiment, the inner surface of a mounting hole of the unusable hole design is at least partly occluded by the elastomer. With this constellation, it is assumed that the mounting hole of the unusable hole design as well as the usable mounting holes are coated on the inner side with the elastomer material. However, from the mounting hole of the unusable hole design, elastomer material protrudes radially inwards from this coating and identifies the corresponding mounting hole as an unusable mounting hole.

According to an alternative embodiment, the mounting hole of an unusable hole design is completely covered by the elastomer. Hence, it is not possible to insert a fastening element, for example a bolt or a screw, into the mounting hole of the unusable hole design without destroying the elastomer material.

According to a further embodiment of this invention, the mounting hole of the unusable hole design is sealed with a plug. This plug is coated with the elastomer on at least one side and is correspondingly secured. The plug can be formed conically, so that it can also be prevented from falling out on the opposite side if no elastomer material is provided there. Usually, however, the plug is covered with elastomer material at both entry openings to the mounting hole. The material of the plug does not necessarily have to be a high-grade corrosion-resistant material. The material should rather be selected from the point of view of cost. Therefore, plugs consisting of wood chips or foamed plastics can be used. The plug in the process acts as a space occupier and saves on elastomer material which otherwise would have to completely fill up the mounting hole.

According to an alternative embodiment of this invention, a sealing element is inserted into the mounting hole of the unusable hole design and is joined to the elastomer by vulcanisation. With this constellation, the sealing element can, for example, already be inserted into the mounting hole of the unusable hole design before the base part is coated with the elastomer material and subsequently coated with the elastomer material and finally joined to it by vulcanisation, so that the possibility of the sealing element falling out is effectively prevented.

BRIEF DESCRIPTION OF THE DRAWINGS

Further details and advantages of this invention result from the description of an exemplary embodiment below in conjunction with the figures.

FIG. 1 shows a perspective partly cutaway view of a damping element in accordance with the present invention;

FIG. 2 shows a plan view of an exemplary embodiment modified compared to the exemplary embodiment shown in FIG. 1; and FIG. 3 shows the exemplary embodiment shown in FIGS. 1 and 2 for an alternative mounting situation.

DETAILED DESCRIPTION OF THE FIGURES

FIG. 1 shows a damping element 1 with an outer part 2 and an inner part 3. The outer part, which can also be referred to as the base element, is formed as a sheet metal part by means of stamping and bending and has a metallic sheet metal core 4 which proportionally forms a middle cylinder section 5, a mounting flange 6 and a mating flange 7. The sheet metal core 4 is completely coated by an elastomer layer 8 formed from an elastomer and joins the inner part 3 to the outer part 2, namely via an elastomer body which is circumferentially enclosed by the cylinder section 5 and is not illustrated. The elastomer forms protruding damping ribs 9 on the mounting flange 6, which are located on an inner edge of the mounting flange 6 leading to the cylinder section 5.

The damping ribs 9 limit the pivoting movement of the inner part 3 which opposite the damping ribs 9 forms a stop plate 10. The stop plate 10 has two convexly shaped outer contour sections 11 as well as two essentially opposing concave outer contour sections 12. Below these outer contour sections 12, the damping ribs 9 leave a free space 13 free.

The inner part 3 has a mounting bore 14. The mounting flange 6 has two through mounting holes 15 which are opposite one another and which—as FIG. 2 demonstrates—are essentially in alignment with the concave outer contour sections 12 of the stop plate 10, i.e. are exposed in the plan view according to FIG. 2. The mounting holes 15 are formed by stamping and bending the metal sheet core 4, as the cutaway part of FIG. 1 in particular demonstrates. The mounting holes 15 correspondingly have a cylinder section 16 projecting towards the fastening side, the free face of which cylinder section 16 defines a fastening plane as an annular surface 17. The annular surface 17 is free of elastomer material.

The two mounting holes 15 exposed in the outer contour sections 12 in FIG. 2 form a first hole design A and are correspondingly identified as mounting holes 15A.

In order to fasten the exemplary embodiment shown in FIGS. 1 and 2, the mounting flange 6 is attached to mating surfaces by means of the annular surfaces 17 of the two mounting holes 15A. Screws or bolts penetrate the mounting holes 15.

The outer part 2 is correspondingly connected to a first element of an oscillating system, for example a chassis. Fastening is also effected with another element of an oscillating system by means of the mounting bore 14, so that the two elements are connected to one another via the damping element 1. With the damping action, a relative movement of the two parts 2, 3 against one another occurs. A wobbling motion can result within the scope of which the stop plate 10 bumps against the damping ribs 9. The concave outer contour sections 12 prevent bumping directly against the mounting flanges from occurring which serve to fasten the outer part 2 via the mounting holes 15.

FIG. 3 illustrates the exemplary embodiment shown in FIGS. 1 and 2 for an alternative installation situation. For this installation situation, the inner part 3 is essentially pivoted by 180° about the axis defined by the mounting bore 14, so that the mounting hole 15 illustrated at the top in FIGS. 2 and 3 is still exposed, whereas with regard to the mounting holes 15 illustrated next to one another at the bottom in FIGS. 2 and 3, the mounting hole 15A exposed in FIG. 2 is partly occluded by one of the convexly shaped outer contour sections 11 and the mounting hole 15B provided next to it is exposed by one of the concave outer contour sections 12 of the stop plate 10. Thus, a further hole design B is shown in FIG. 3 and the mounting holes forming this hole design are correspondingly identified by the is reference symbol B. The further hole design B serves to fasten the outer part 2 to an alternatively formed element of the oscillating system.

As FIG. 1 illustrates, the mounting hole identified by reference symbol 15B is made unusable. For this purpose, a plastic plug 18 is inserted into the mounting hole 15B. The mounting hole 15B is otherwise fully formed, i.e. it has the cylinder section 16. The mounting hole is, however, also coated with the elastomer material on the fastening side and accordingly protected against corrosion there. The elastomer accordingly seals the plastic plug 18 and secures it in the mounting hole 15B.

Instead of a plastic plug 18, alternatively the mounting hole 15B can also be completely sealed by the elastomer material. Equally, the mounting hole 15B can also only be partly occluded or sealed.

As the exemplary embodiment illustrates, the parts forming the damping element 1 are designed identically. The outer part 2 forms a base element as an example in terms of this invention. This outer part 2 has three mounting holes 15, of which in each case two form a hole design A or B. In each case, two of these mounting holes 15 are also usable as such for the respective installation situation. The other mounting hole 15A or 15B is unusable, namely due to the corresponding formation of the elastomer material. This elastomer material in the exemplary embodiment according to FIG. 1 holds the plastic plug 18. In the alternative according to FIG. 2, the inner circumferential surface of the mounting hole 15 is partly occluded or sealed by the elastomer material, so that it is identified that that particular mounting hole 15B is not to be selected for assembly purposes, even if possibly a fastening screw, which otherwise can be inserted through the mounting holes 15A, would fit through the corresponding hole 15B.

In the case of the exemplary embodiment according to FIG. 3, the mounting hole 15A of the first hole design A adjacent to the mounting hole 15B is occluded and therefore made unusable. With this exemplary embodiment, the elastomer material extends through the whole mounting hole 15A.

Apart from the annular surfaces 17 of the mounting holes 15 provided for fastening, the outer part 2 is completely coated with elastomer material as protection against corrosion. In addition, the elastomer material forms functional surfaces and elements of the damping element 1, so that this elastomer material in combination provides both the protection against corrosion and is used for the damping action within the damping element 1, i.e. it enables the relative movement between the two parts 2, 3 to occur in a damping manner and in any event limits it via the damping ribs 9 as stops.

REFERENCE NUMERALS

1 Damping element
2 Outer part/base element
3 Inner part
4 Sheet metal core
5 Cylinder section
6 Mounting flange
7 Mating flange
8 Elastomer layer
9 Damping rib
10 Stop plate
11 Convex outer contour section
12 Concave outer contour section
13 Free space
14 Mounting bore
15 Mounting hole
16 Cylinder section
17 Annular surface
18 Plastic plug

The invention claimed is:

1. A damping element having a base element for fastening the damping element by means of mounting holes, comprising:
   a base element having a metallic base body, the metallic base body having mounting holes defined therein, the mounting holes including a first plurality of mounting holes and at least one additional hole; and
   an elastomer coating on the metallic base body, the elastomer coating covering generally all of the metallic base body except for an area around each of the first plurality of mounting holes, the at least one additional hole being at least partly occluded by the formation of the elastomer coating on the base body such that the at least one additional hole is not usable as a mounting hole.

2. The base element according to claim 1, wherein the at least one additional is fully occluded by the elastomer.

3. The base element according to claim 1, wherein the at least one additional hole is completely covered by the elastomer.

4. The base element according to claim 1, further comprising a plug, the at least one additional hole being sealed with the plug, which is coated with the elastomer on at least one side of the plug.

5. The base element according to claim 1, further comprising a sealing element inserted into the at least one additional hole, the sealing element being joined to the elastomer by vulcanisation.

6. A base element according to claim 1, wherein the elastomer coating material at least partly occluding the at least one additional hole forms an indicator indicating that the at least one additional hole is not usable as a mounting hole.

7. A base element according to claim 1, wherein the mounting holes form at least two hole patterns, a first one of the hole patterns comprising the first plurality of mounting holes and a second one of the hole patterns comprising the at least one additional hole.

8. A damping element having a base element for fastening the damping element by means of mounting holes, comprising:
   a base element having a metallic base body, the metallic base body having mounting holes defined therein, the mounting holes including a first plurality of mounting holes and at least one additional hole; and
   an elastomer coating on the metallic base body, the elastomer coating covering generally all of the metallic base body except for an area around each of the first plurality of mounting holes, the at least one additional hole being at least partly occluded by the formation of the elastomer coating on the base body such that the elastomer coating material at least partly occluding the at least one additional hole forms an indicator indicating that the at least one additional hole is not usable as a mounting hole.

9. A method of providing a damping element having a base element for fastening the damping element by means of mounting holes, the method comprising:
   providing a base element having a metallic base body;
   providing a plurality of mounting holes in the metallic base body, the mounting holes including a first plurality of mounting holes and at least one additional hole; and
   forming an elastomer coating on the metallic base body such that the elastomer coating covers generally all of the metallic base body except for an area around each of the first plurality of mounting holes, and the at least one additional hole is at least partly occluded by the formation of the elastomer coating on the base body such that the at least one additional hole is not usable as a mounting hole.

* * * * *